Figure 1:
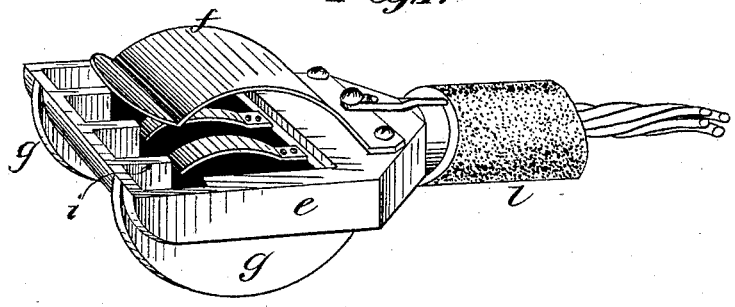

(No Model.)  3 Sheets—Sheet 1.

W. P. WIDDIFIELD & A. H. BOWMAN.
ELECTRIC CIRCUIT COUPLING FOR RAILWAY TRAINS.

No. 433,706. Patented Aug. 5, 1890.

Witnesses
D. W. Gardner
Nellie L. Pope

Inventors:
Watson P. Widdifield
Alexander H. Bowman
By their Attorney,
Edward P. Thompson (No Model.) 3 Sheets—Sheet 2.
W. P. WIDDIFIELD & A. H. BOWMAN.
ELECTRIC CIRCUIT COUPLING FOR RAILWAY TRAINS.
No. 433,706. Patented Aug. 5, 1890.
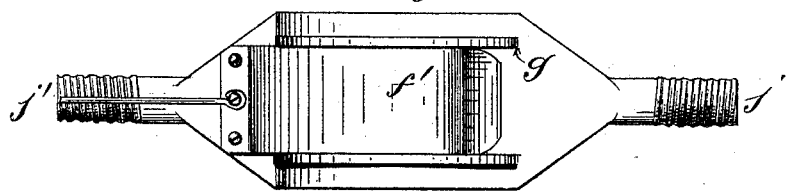
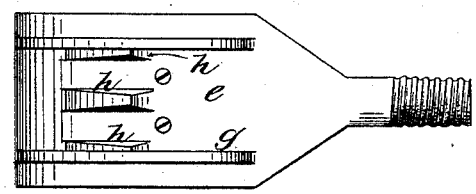
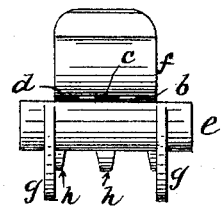 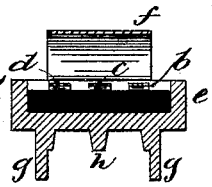
Witnesses:
D. W. Gardner
Nellie L. Pope
Inventors:
Watson P. Widdifield
Alexander H. Bowman
By their Attorney,
Edward P. Thompson (No Model.)  3 Sheets—Sheet 3.
W. P. WIDDIFIELD & A. H. BOWMAN.
ELECTRIC CIRCUIT COUPLING FOR RAILWAY TRAINS.
No. 433,706.  Patented Aug. 5, 1890.
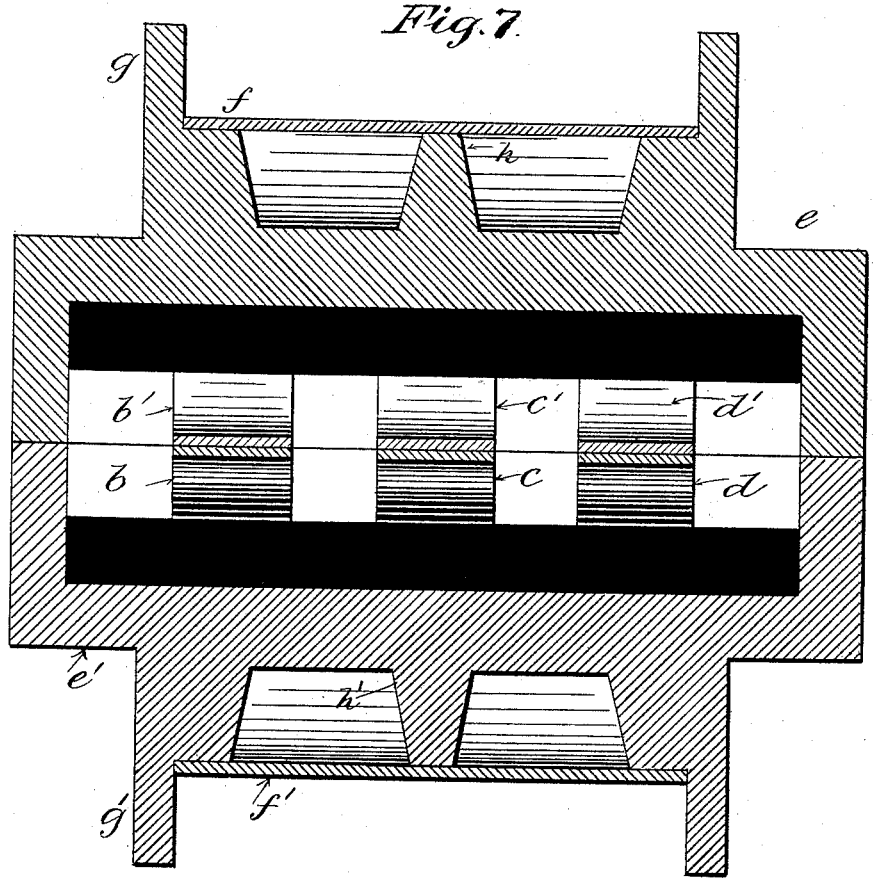

UNITED STATES PATENT OFFICE.

WATSON P. WIDDIFIELD, OF UXBRIDGE, ONTARIO, CANADA, AND ALEXANDER HAMILTON BOWMAN, OF ALLENTOWN, PENNSYLVANIA, ASSIGNORS, BY MESNE ASSIGNMENTS, TO THE WESTINGHOUSE AIR BRAKE COMPANY, OF PITTSBURG, PENNSYLVANIA.

ELECTRIC-CIRCUIT COUPLING FOR RAILWAY-TRAINS.

SPECIFICATION forming part of Letters Patent No. 433,706, dated August 5, 1890.

Application filed March 8, 1889. Renewed February 4, 1890. Serial No. 339,128. (No model.) Patented in Canada December 18, 1888, No. 30,424, and in Italy December 18, 1888, No. 493.

*To all whom it may concern:*

Be it known that we, WATSON P. WIDDIFIELD, residing at Uxbridge, Province of Ontario, Canada, and a subject of the Queen of Great Britain, and ALEXANDER HAMILTON BOWMAN, a resident of Allentown, Pennsylvania, and a citizen of the United States, have invented certain new and useful Improvements in Electric Coupling for Electric Brakes, (Case No. 3,) (patented in Canada December 18, 1888, No. 30,424, and in Italy December 18, 1888, No. d'odine 493,) of which the following is a specification.

The invention relates to the mechanical construction of a coupling especially adapted to be applied to railway-trains equipped with a system of electric signals, electric brakes, or any other system in which it becomes convenient and necessary to obtain an electrical connection between the cars and locomotive.

The object of the invention is to provide an electric coupling simple in mechanical construction, the same consisting of but two parts in exact duplicate, and to obtain a coupling in which the insulation is thoroughly protected from the injurious effects of the weather, and to obtain, together with the above-named functions, a coupling which will serve to connect four terminals of electric conductors on one car with four other similar terminals on another car or locomotive.

We have filed two applications relating to the same subject-matter, both showing, but only one claiming, the same thing. This the present application is one, while we refer to the other by the following data: Serial No. 289,469, filed October 29, 1888, entitled "Electric Brakes for Railway-Trains," and allowed February, 1889, patented February 26, 1889, No. 398,577.

The details of construction are fully set forth by reference to the accompanying drawings.

Figure 2:
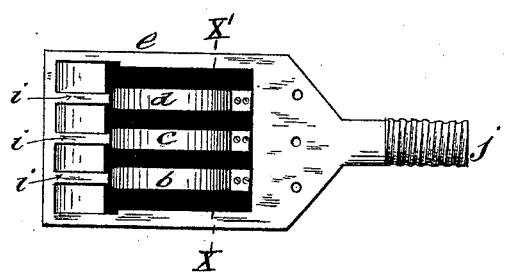
Figure 3:
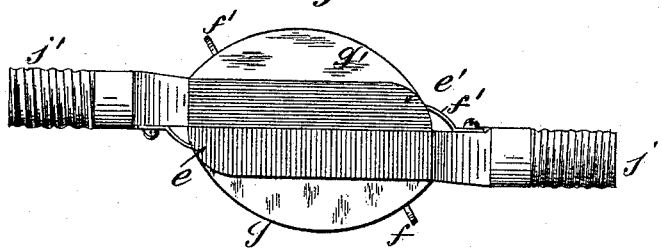

Figure 1 is a perspective view of one half of the coupling, showing the top, one side, and the end thereof. Fig. 2 is a top view of one half of the coupling, with one of the spring-contacts omitted so as to show more clearly the internal construction. Fig. 3 is a side view of the coupling, showing the two parts as they appear when they are together. Fig. 3$^a$ is a plan view of Fig. 3. Fig. 4 is a bottom view of one half of the coupling, showing Fig. 2 inverted and showing the ribs projecting from the under side of the said one half of the coupling. Fig. 5 is a cross-sectional view of one half of the coupling, taken approximately at the line X, and looking in the direction of the arrow shown in Fig. 2. Fig. 6 is an end view of one half of the coupling, looking toward that end to which the hose is attached; and Fig. 7 is an enlarged view of a portion, showing clearly the springs of one half of the coupling in contact with springs in the other half.

The device and electrical and mechanical connections, as far as our invention is concerned, consist of the combination of two duplicated parts, each consisting of the combination of an insulating-block $a$, supporting three separated metallic spring-contacts, which are free at one end each and fastened at their remaining ends to the said insulating-block, and each spring-contact being lettered $b$, $c$, and $d$ in one half and $b'$, $c'$, and $d'$ in the other half of the coupling; a metallic casing or box $e$, in the bottom of which tightly fits and is fastened the said insulating-block $a$, (the corresponding parts in the other half of the coupling being lettered the same, with the addition of the prime-mark ';) a spring-contact $f$, secured at one end to the said box and free at the other end, the said spring projecting over the said three springs $b$, $c$, and $d$; ribs $g$, of a given size, cast upon the bottom of the said box, the spring $f$ of one half of the coupling fitting tightly between two ribs $g'$ of the other coupling when the two parts of the coupling are placed together, and the projecting end of the spring $f$ in one half of the coupling pressing upon the bottom of the box in the other half of the coupling, so that the spring $f$ and spring $f'$ has contact with iron box, respectively, of the halves of the coupling, the contact with the bottom of the boxes being better insured by projections $h$, which are lower than those projections lettered $g$; internal ribs $i$ opposite the ends of the springs $b$, $c$, and $d$ and located in the said box, the ribs $i$ of one half of the coupling pressing upon the ribs $i'$ of the other half and forming guides and contact-surfaces for each half in reference to the other half; roughened cylindrical ends or projections $j$, upon which fit rubber tubes $l$.

The further details are as follows: The springs $b$, $c$, and $d$ in each half have curved portions, which project above the upper edges of the boxes $e$ and $e'$, so that when the two parts of the coupling are put together the springs of one half will come into contact with the springs of the other half.

Two of the ribs $h$ form a part in each half of the coupling of the ribs $g$, as shown clearly in Fig. 4. Upon these ribs, in one half of the coupling, rest and press the spring $f$ of the other coupling. The boxes $e$ and $e'$ when together form a closed space, in which rain or dust cannot enter and deteriorate the insulation or form short circuits between the wrong springs. The springs $f$ and $f'$, together with the boxes upon which they are attached, form the terminals of electrical conductors as to one path of the circuit, while the springs $b$, $c$, and $d$ form the other terminals of the remaining conductors.

The function of the springs $f$ and $f'$ is threefold—namely, to form electrical contacts, as above stated; to prevent the two halves from lateral motion, thereby forming a strengthening device in combination with the ribs $g$ and $g'$; and to perform the service of a clamping device, whereby the said springs grasp the two halves of the coupling in an effective manner and to such an extent that it takes a strong man to pull them apart. At times this spring $f$ and $f'$ may be strengthened by bending it to a greater extent toward the other contact-springs, or on the other hand it may be bent upward, so that the two parts may be more easily joined or separated. The holding or clasping power is increased also by the reactive force of the springs $b\ c\ d$ pressing against the springs $b'$, $c'$, and $d'$. These latter springs may also be bent to regulate the force with which the two halves of the coupling may be held together.

The springs $f\ b\ c\ d$ in each half are fastened at the same end of the box $e$ and $e'$, respectively.

The coupling is manipulated by pushing the parts together to complete the circuits and by pulling them apart to break the circuits.

We claim as our invention—

1. An electric coupling consisting of the combination of electrical conducting-casings provided with multiple interior electric terminals electrically connected in pairs and insulated from said casings, and spring electric terminals located upon the exterior of said casings and pressing upon the same, all of said springs being included in electric circuits and the said casings being in electrical contact.

2. A coupling formed of two halves, each provided with a pair of ribs and with a spring, the spring on one half pressing upon the other half and located between the members of the pair of ribs upon the said other half and each half being provided with electric terminals.

In testimony that we claim the foregoing as our invention we have signed our names, in presence of two witnesses, this 16th day of February, 1889.

WATSON P. WIDDIFIELD.
ALEXANDER HAMILTON BOWMAN.

Witnesses as to signature of Widdifield:
J. W. WIDDIFIELD,
T. W. CHAPPLE.

Witnesses as to signature of Bowman:
EMERSON F. SCHOCK,
NATHAN STERNER.